US005188336A

United States Patent [19]

Graner et al.

[11] Patent Number: 5,188,336

[45] Date of Patent: Feb. 23, 1993

[54] MAGNET SYSTEM FOR A VALVE

[75] Inventors: Juergen Graner, Ludwigsburg; Hans Kubach, Korntal-Muenchingen, both of Fed. Rep. of Germany

[73] Assignee: Robert Bosch GmbH, Stuttgart, Fed. Rep. of Germany

[21] Appl. No.: 487,576

[22] Filed: Mar. 2, 1990

[30] Foreign Application Priority Data

Jun. 28, 1989 [DE] Fed. Rep. of Germany ....... 3921151

[51] Int. Cl.[5] ....................... F16K 31/08; F02M 51/06; H01F 7/13

[52] U.S. Cl. ................................. 251/129.16; 251/65; 251/129.21; 239/585.3

[58] Field of Search ................ 251/65, 129.16, 129.21; 239/585, 585.3

[56] References Cited

U.S. PATENT DOCUMENTS

| | | | |
|---|---|---|---|
| 4,020,433 | 4/1977 | Uchidoi et al. . | |
| 4,240,055 | 12/1980 | Shimizu et al. . | |
| 4,512,549 | 4/1985 | Gast et al. | 251/65 X |
| 4,546,339 | 10/1985 | Kubach . | |
| 5,029,807 | 7/1991 | Fuchs | 251/65 |

FOREIGN PATENT DOCUMENTS

| | | |
|---|---|---|
| 3237532 | 4/1984 | Fed. Rep. of Germany . |
| 3336011 | 4/1985 | Fed. Rep. of Germany . |
| 3501193 | 7/1986 | Fed. Rep. of Germany . |

*Primary Examiner*—Arnold Rosenthal
*Attorney, Agent, or Firm*—Edwin E. Greigg; Ronald E. Greigg

[57] ABSTRACT

A magnet system for an outwardly opening magnet valve having a core winding, an armature carrying the valve body, and a permanent magnet disposed symmetrically to the winding. The closed magnet circuits of the electromagnet and permanent magnet partly overlap, and a ring of ferromagnetic material is associated with the permanent magnet 1 in the magnet circuit of the electromagnet, this ring absorbs half the flux I of the permanent magnet, and the magnet circuit for the electromagnet is dimensioned to one-half the permanent flux.

23 Claims, 3 Drawing Sheets

20
19
4
5
6
17
18
3
III
II
21
23
14
22
1
7
2
10
15
13
9
8
11
12
24
M'
M'
M

MAGNET SYSTEM FOR A VALVE

BACKGROUND OF THE INVENTION

The invention relates to a magnet system for a valve as defined herein.

In magnet valves, a free-floating armature coupled with a valve body has an the advantage which does include a mass to be moved for the bearing guides, it has a higher natural frequency because of a more-compact structure, and hence it has better hydraulic damping upon impact, with less wear. A compact structure reduces the wobble of the armature and minimizes hydraulic oscillations and errors in linearity. Problems of fuel delivery through the bearings disappear. Bearing jamming is eliminated and costs are reduced. A free-floating armature, because of greater orbital tolerances, necessarily minimizes both interference forces and the masses to be moved.

There are already magnet valves in which the permanent magnet is embodied as a plate and the magnetic lines of force of the permanent magnet run in the same direction as the coil of the electromagnet, and in which the armature is embodied as a valve body and opens in the direction of the lower-pressure side; such a valve is described in German Offenlegungsschrift 3 237 532. However, at higher voltage and with switching of the end stage of the electronics, the attraction of the armature cannot be prevented. It has therefore already been proposed that a second permanent magnet be provided. In another known device, namely a camera shutter described in U.S. Pat. No. 4,240,055, although the requirements for low mass, high magnetic efficiency, low magnet conductor cross sections, stable axial position and calibratability can be met, nevertheless a reversal of the magnetic field when there is a variable feed voltage cannot be systematically prevented. Furthermore, because of a three-piece armature, this camera shutter is expensive, and the non-circularly symmetrical arrangement causes manufacturing tolerances with undesirable interference forces. Also, attraction at elevated voltage cannot be prevented very well.

OBJECT AND SUMMARY OF THE INVENTION

The magnetic valve according to the invention has an advantage over the prior art that reversal of the polarity of the main field can be prevented, and without boosting the stray flux.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
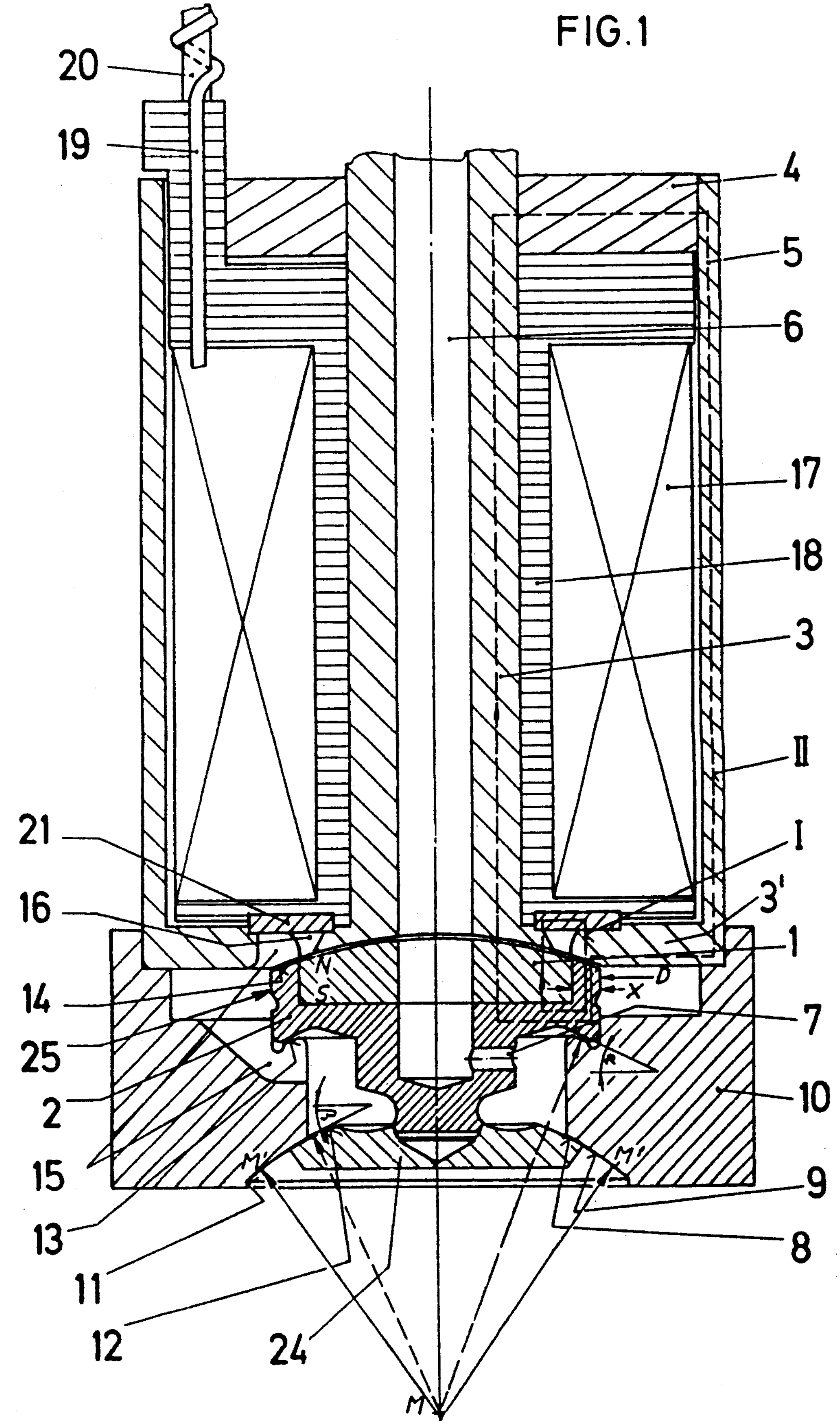
FIGS. 1–3 each show one section through a magnet system, for three different possibilities for embodying it.

The fuel injection valve shown in the drawing, for a fuel injecting system, is used for instance to inject fuel into the intake tube of mixture-compressing internal combustion engines with externally supplied ignition. In FIG. 1, a permanent magnet 1 is embedded in a ferromagnetic material that forms an armature 2. Facing this permanent magnet 1 is, among other elements, an axially aligned inner pole tube 3 of ferromagnetic material that forms the core of an electromagnet that has windings 17. The magnet circuit of this electromagnet is closed by the ferromagnetic parts of the tube 3, a cover plate 4 and an outward axially extending jacket 5. An outer pole 3′ extends radially from said pole 3 to magnetically connect said inner pole 3 with said jacket 5. The bore 6 of the tube 3 is continued in a blind bore in the permanent magnet 1 and in the armature 2. Thus, the bore 6 can be used to supply fuel, which reaches the sealing seat 8 via various radial bores 7 in the armature and an annular area surrounding the lower end of armature 2; the precisely defined stroke of the armature 2 determines the metering of the fuel between the sealing seat 8 and the valve body 24. The bearing face 9 in the bottom plate 10 may be embodied as a cone, or as a rotational surface made up of circular arcs with the center point M. If the working valve closing faces of the armature 2 is for instance embodied as spherical, which can also be approximated as a cone, then the radial magnetic forces are reduced. With the valve open, the fuel film is directed at an angle suitable for creating turbulence against a bent edge 11 of the bearing face 9 of the valve body 24, and the actual atomization then takes place.

The bottom plate 10 is inserted in a pressure tight manner into the jacket 5. The following elements are embodied as spherical segments, for instance having the center point M: the stop face 12, cooperating with the sealing seat 8 and the bearing face 9, of the valve body 24; the stop 13 of the armature 2; and the air gap 14 between the armature 2, provided with the permanent magnet 1, and the tube 3. Slits 15 and an annular conduit 16 in the bottom plate 10 around the armature 2 are provided for directing the fuel positively displaced by the stroke.

As can seen from the drawing, the windings 17 are disposed on a coil body 1B, and a winding wire 19 is welded to an electrical source plug pin 20. If a current $I<I_{an}$ flows through the winding 17, then the permanent magnet 1 pulls upward, with the armature 2 serving as an iron short-circuit means, and the valve blocks fuel flow. If the winding is excited with a current $I>I_{ab}$ in the correct direction, then the attracting axially parallel primary field is reduced, and a repelling force is created at the circumference of the permanent magnet 1 from a stray field; that is, the valve opens as a result of the pressure of the entering fuel. By increasing the stray flux, with $D>>x$, the attraction that recurs when I is large can be reduced.

$I_{an}$ indicates the current at which the armature is attracted by the resultant magnetic field; that is, at which the valve body 24 rests on the sealing seat 8.

$I_{ab}$ indicates the current that generates a magnetic field that as a result, with the permanent magnetic field, leads to a repulsion of the armature 2 and hence to a lifting of the valve body 24 from the sealing seat 8.

The reversal of the primary field can now be completely prevented, if the paths I and II of the permanent magnet flux are suitably embodied, by using a ring 21 of ferromagnetic material that then practically short-circuits one portion of the jacket 5 and tube 3 in the vicinity of the armature 2. If the ring 21 prior to saturation at $\phi_{Imax}$ can absorb precisely half the flux of the permanent magnet armature, then $\phi_{Imax}=\phi_{IImax}$, and the path II will be correspondingly to be dimensioned to one-half the permanent flux. If a flux of $-20\phi_{IImax}$ is now switched counter to the $\phi_{II}$ with the electric current, then the air gap flux becomes zero, and the force of the primary field also becomes zero. A further increase of the flux above $2\phi_{IImax}$ can be prevented if this path is saturated at $\pm\phi_{IImax}$. The reversal of the primary field is accordingly prevented, even without artificially raising the stray flux. I represents the magnetic flux of the permanent magnet 1, and II represents the magnetic flux of the electromagnet.

It should also be pointed out that by attenuating the magnetic force of the permanent magnet 1, the attraction time of the magnet can be lengthened, and the decay time can be shortened. This also provides the option of a dynamic calibration.

The jacket face 25 of the armature 2 can also be shifted into the interior of the permanent magnet 1, by correspondingly increasing the diameter of the permanent magnet 1. In that case the permanent magnet 1 is located facing the outer pole and the soft iron is located facing the inner pole.

Figure 2:
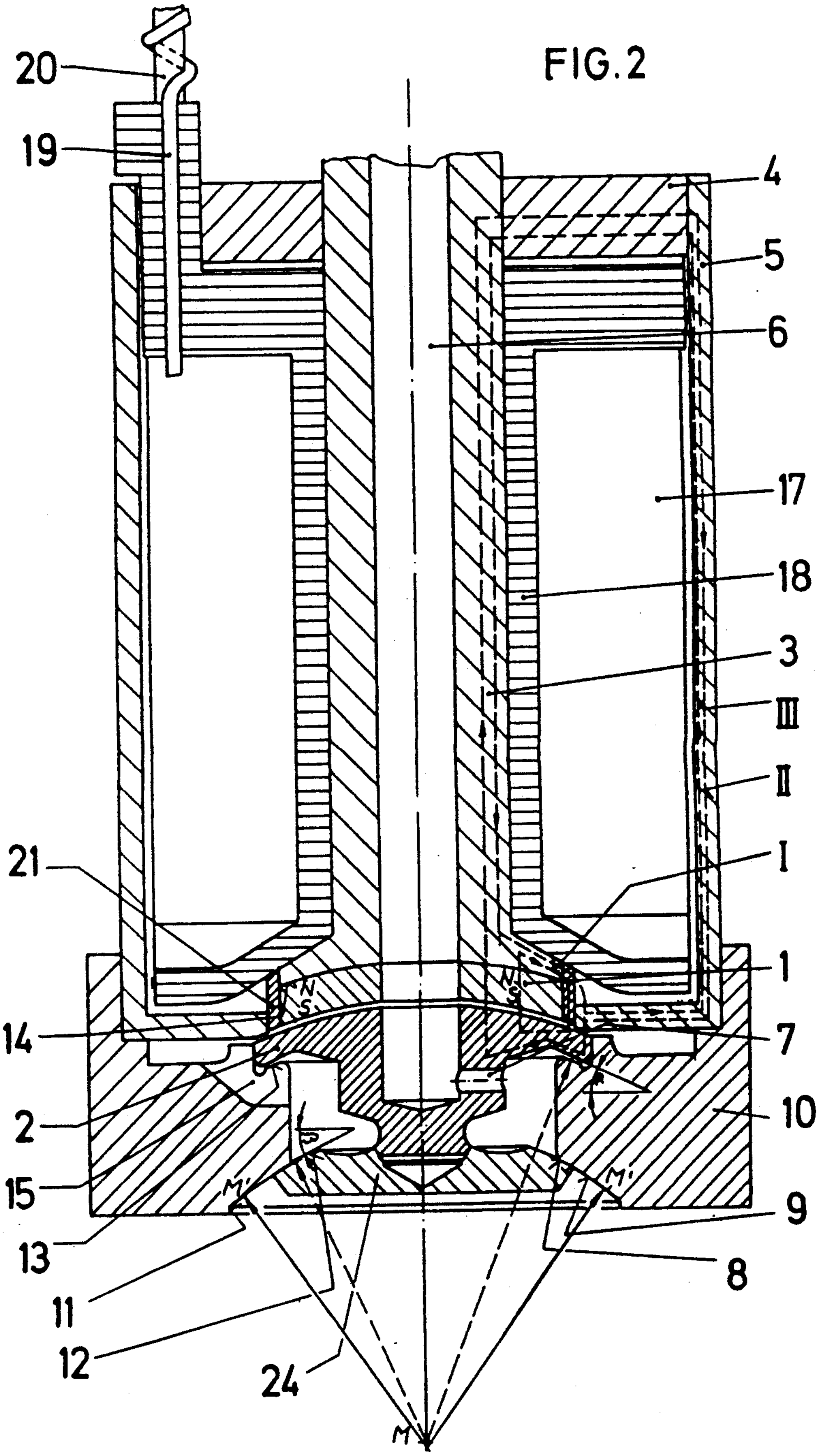

FIG. 2 is similar to FIG. 1, but here the permanent magnet 1 is located in the part of the system that is stationary and the ring 21 is coaxial with the axis of the body. Thus, the already slight repulsion of the armature 2 when current I is switched on is now dispensed with entirely. The reversal of the field, can, however, be arbitrarily varied via the ratio $\phi_I$: $\phi_{II}$, saturation of $\phi_{IImax}$. Now, one need no longer rely on the repulsion; by matching the ferromagnetism of the ring 21 to the hydraulic pressure, $\phi_{IImax}$ can be made to equal $\phi_I$ (including the stray flux). It is particularly advantageous if the part of $\phi_{II}$ not already defined by straying is stabilized by means of magnetic saturation. The prevention of the field reversal is also important for the shortest attraction time when I→0, because the field stroke over time is then less. At the inner pole, the air gap 14 is enlarged, to create a route for the positively displaced fuel. As can be seen from FIG. 2, the ring 21 here limits the radial circumference of the permanent magnet 1 toward the jacket 5, and the magnet circuit of the permanent magnet can be kept relatively small.

In FIG. 3, which once again is similar to FIG. 1, the resting permanent magnet 1 is flat and is disposed on the outer pole 23. Here, in addition to the ring 21, a ferromagnetic ring 22 with high saturation induction relative to the concentration of the low field intensity in the permanent magnet 1 is particularly appropriate. The gaps 15 for further direction of the fuel can be particularly simply accommodated in the ring 22.

Figure 3:
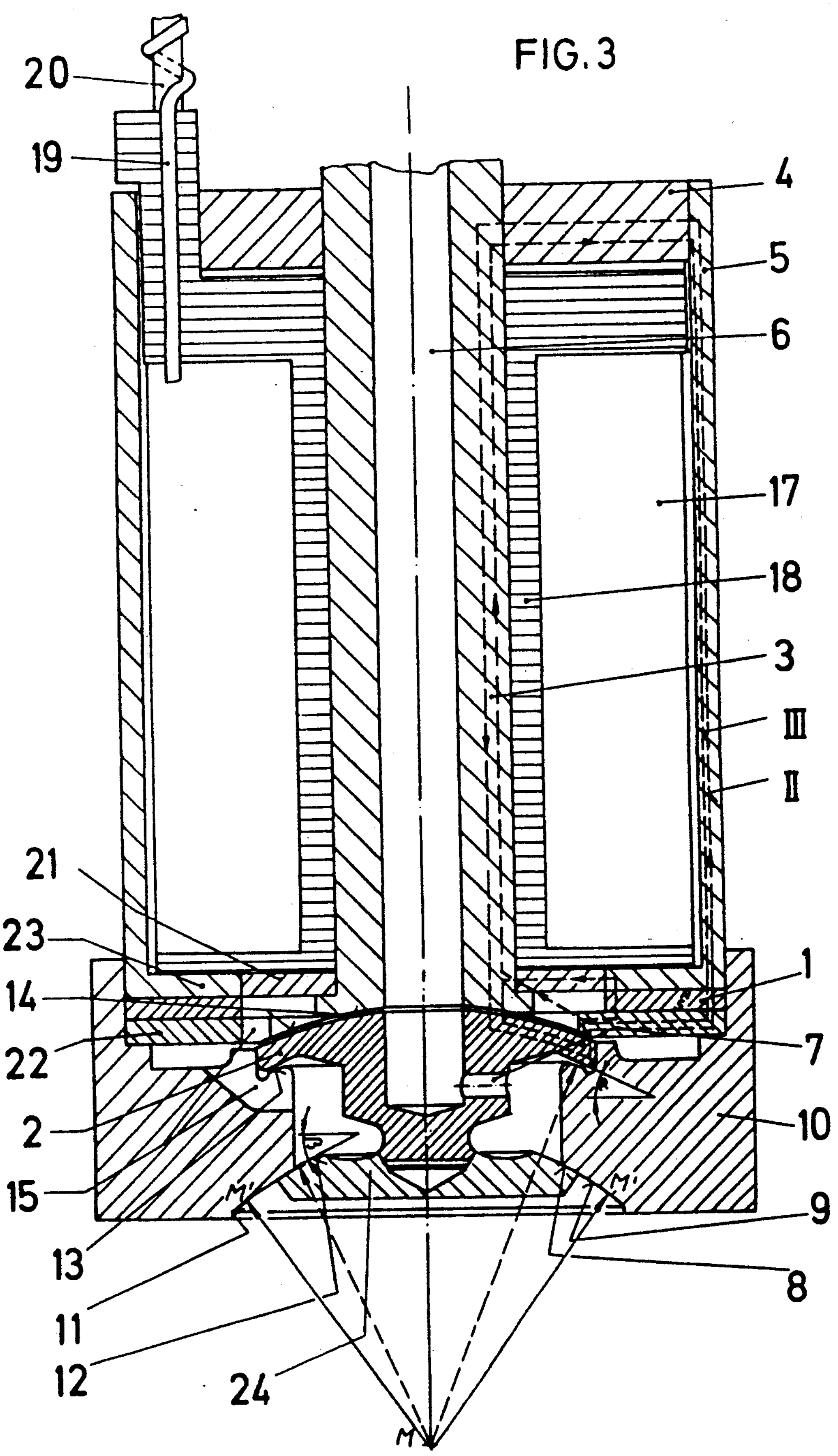

The armature 2 of FIGS. 2 and 3 is lighter than that of FIG. 1, because the permanent magnet 1 is not carried by the armature. With equal force, FIG. 3 makes an even lighter and more compact armature 2 possible, because the flux can be still further concentrated in the armature region, and the path length through the ring 22 can be shortened. The mass of the armature 2 can be less than in the prior art, because of the short magnet paths. The force per unit of surface area is after all proportional to the square of the flux density. The ring 22 also protects the permanent magnet from corrosion.

In FIG. 3, a particularly large surface of the permanent magnet 1 can be selected, so that the magnetic voltage drop for the flux of the electromagnet can be reduced. The permanent magnet 1 is also flat. The stray flux $\phi_{III}$ of the electromagnet o path III of FIGS. 2 and 3 increases somewhat, because of the basically longer air gap; however, this disadvantage is compensated for by the resultant necessarily shorter magnet path lengths in the armature 2 and thus the smaller mass. With saturation in the stationary part of the path I, the stray flux $\phi_{III}$ is not increased to the same extent; instead, flux $\phi_I$ desirably relieves the stationary part of the path II of 50% of the magnet flux.

The armature 2 in FIGS. 2 and 3 is in one piece. Problems of securing the permanent magnet to the impacting system are thereby eliminated.

In all the exemplary embodiments, the armature 2 is circular-symmetrical, thus providing precise concentric manufacture and assembly of the parts relative to one another and minimizes undesirable radial forces. Also, a spring is no longer necessary to move the armature 2, so that interference forces are also thereby diminished. Even if the electric current fails, the valve is blocked, since the permanent magnet 1 attracts the armature 2 when it is without current, and switches off when the electric current switches on. The minimization of the armature mass makes it possible to maximize the switchable forces per unit of surface area of the magnet. On the other hand, the capacity of triggering of the magnet system can be kept low, thereby reducing the costs for electronics and power loss in the valve; that is, the energy linked to the electromagnet and correspondingly the magnetic voltage drop of the primary flux can be concentrated onto the stroke movement, with high specific magnetic resistance in the unilateral force direction.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A magnet system for an outwardly opening magnet valve having an outward axially extending jacket (5) connected with an outer pole (3') and surrounding a core winding (17), an inner axially extending pole (3) arranged inwardly in said core winding (17) and formed by a central tube, an armature (2), a valve body carried by said armature, a permanent magnet (1) disposed symmetrically with respect to the winding (17), wherein the closed magnet circuit of the electromagnet and the permanent magnet (1) partly overlap, a ring (21) of ferromagnetic material in the magnet circuit of the electromagnet, said ring (21) is associated with the permanent magnet (1) and magnetically connects said jacket (5) with said inner and outer poles, said ring (21) reduces a flux (I) of the permanent magnet (1) to one-half of its total flux output, and the magnet circuit for the electromagnet is reduced to one-half of the permanent flux of sad permanent magnet.

2. A magnet system as defined by claim 1, in which said armature (2) is circular-symmetrical.

3. A magnet system as defined by claim 1, in which said permanent magnet (1) is carried by said armature (2).

4. A magnet system as defined by claim 2, in which said permanent magnet (1) is carried by said armature (2).

5. A magnet system as defined by claim 1, in which an attraction time of the magnet is lengthened and the decay time of the magnet flux is shortened by attenuation of the permanent magnet (1).

6. A magnet system as defined by claim 2, in which an attraction time of the magnet is lengthened and the decay time of the magnet flux is shortened by attenuation of the permanent magnet (1).

7. A magnet system as defined by claim 3, in which an attraction time of the magnet is lengthened and the decay time of the magnet flux is shortened by attenuation of the permanent magnet (1).

8. A magnet system as defined by claim 4, in which an attraction time of the magnet is lengthened and the decay time of the magnet flux is shortened by attenuation of the permanent magnet (1).

9. The magnet system as defined by claim 1, which includes a radially extending cover plate (4), and the magnet circuit is closed from the jacket (5) to the armature (2).

10. The magnet system as defined by claim 2, which includes a radially extending cover plate (4), and the magnet circuit is closed from the jacket (5) to the armature (2).

11. The magnet system as defined by claim 3, which includes a radially extending cover plate (4), and the magnet circuit is closed from the jacket (5) to the armature (2).

12. The magnet system as defined by claim 5, which includes a radially extending cover plate (4), and the magnet circuit is closed from the jacket (5) to the armature (2).

13. A magnet system as defined by claim 9, in which a bore (6) in the central tube (3) continues in the permanent magnet (1) and extends into the premature (2).

14. A magnet system as defined claim 1, in that the armature (2) extends into the interior of the permanent magnet (1).

15. A magnet system as defined by claim 9, in which said permanent magnet (1) is firmly joined to the tube (3) and faces the armature (2).

16. A magnet system as defined by claim 13, in which said permanent magnet (1) is firmly joined to the tube (3) and faces the armature (2).

17. A magnet system as defined by claim 9, in which said permanent magnet (1) is disposed in axial alignment with the winding (17) and facing the outer pole.

18. A magnet system as defined by claim 1, in which said ring (21) defines an outer limit of the permanent magnet (1).

19. A magnet system as defined by claim 9, in which said ring (21) defines an outer limit of the permanent magnet (1).

20. A magnet system as defined by claim 17, in which said ring (21) defines an outer limit of the permanent magnet (1).

21. A magnet system as defined by claim 9, which includes a further ring (22) of ferromagnetic material in contact with the permanent magnet (1).

22. A magnet system as defined by claim 17, which includes a further ring (22) of ferromagnetic material in contact with the permanent magnet (1).

23. A magnet system as defined by claim 18, which includes a further ring (22) of ferromagnetic material in contact with the permanent magnet (1).

* * * * *